United States Patent
Martin

(10) Patent No.: US 6,307,543 B1
(45) Date of Patent: Oct. 23, 2001

(54) BI-DIRECTIONAL DATA TRANSFER USING TWO PAIR OF DIFFERENTIAL LINES AS A SINGLE ADDITIONAL DIFFERENTIAL PAIR

(75) Inventor: Russel A. Martin, Menlo Park, CA (US)

(73) Assignee: Silicon Image, Inc., Sunnyvale, CA (US)

(*) Notice: Subject to any disclaimer, the term of this patent is extended or adjusted under 35 U.S.C. 154(b) by 0 days.

(21) Appl. No.: 09/393,234

(22) Filed: Sep. 9, 1999

Related U.S. Application Data

(60) Provisional application No. 60/099,826, filed on Sep. 10, 1998.

(51) Int. Cl.[7] ................................................. G09G 5/00
(52) U.S. Cl. .......................................... 345/213; 345/115
(58) Field of Search ..................................... 345/115, 156, 345/213; 375/257; 710/129, 131, 100; 714/14; 713/320; 712/91

(56) References Cited

U.S. PATENT DOCUMENTS

| | | | |
|---|---|---|---|
| 5,485,488 | 1/1996 | Van Brunt et al. | 375/257 |
| 5,526,017 | 6/1996 | Wilkie | 345/115 |
| 5,805,974 | 9/1998 | Hite et al. | 455/3.2 |
| 5,850,209 | 12/1998 | Lenke et al. | 345/156 |
| 5,905,389 * | 5/1999 | Alleven | 327/108 |
| 5,946,641 * | 8/1999 | Morys | 702/91 |
| 6,009,529 * | 12/1999 | Park | 713/320 |
| 6,058,441 * | 5/2000 | Shu | 710/100 |
| 6,125,455 * | 9/2000 | Yeo | 714/14 |
| 6,141,719 * | 10/2000 | Rafferty et al. | 710/131 |
| 6,173,355 * | 1/2001 | Falik et al. | 710/129 |

FOREIGN PATENT DOCUMENTS

| 4444312C | 2/1996 | (DE) | H04L/5/20 |
|---|---|---|---|
| WO 96/31966 | 10/1996 | (WO) . | |

* cited by examiner

Primary Examiner—Kent Chang
Assistant Examiner—Nitin Patel
(74) Attorney, Agent, or Firm—Fenwick & West LLP

(57) ABSTRACT

Data is transferred from a processor to a display in one direction. However, there are many reasons for data to be transferred in both directions along a cable connecting the processor and display. This invention describes a method of sending data from the display back to the processor computer in a situation in which the video data transferred to the display is in digital form. Differential wire pairs are used to transmit red, green and blue digital pixel data in a first direction from the processor to the display using a high common mode rejection ratio in each of the twisted wire differential pairs. Using this common mode, digital data may be serially transmitted in a reverse direction from the display. The common mode is offset between two of the twisted wire differential pairs by varying the DC offset or reference voltage in one of the twisted wire differential pairs relative to the other differential pair. Both wires in a pair have their DC offset adjusted to as not to affect digital pixel data transmitted in a forward direction. DC offsets in each pair are compared, with a change in DC offset of one pair used for transmitting a logic high and a change in the DC offset of the other pair used for transmitting a logic low. In this way, bidirectional data transfer is accomplished without increasing the number of twisted wire pairs coupled between the processor and display.

12 Claims, 5 Drawing Sheets

BI-DIRECTIONAL DATA TRANSFER USING TWO PAIR OF DIFFERENTIAL LINES AS A SINGLE ADDITIONAL DIFFERENTIAL PAIR

RELATED APPLICATIONS

This application claims the benefit of U.S. Provisional Application No. 60/099,826, entitled "Bidirectional Data Transfer Using Two Pair of Differential Line as a Single Additional Differential Pair in a Digital Data Stream" which was filed on Sep. 10, 1998.

BACKGROUND OF THE INVENTION

Most computer systems consist of a processor unit and a number of peripheral devices coupled to the processor unit. The peripheral devices send and receive information to and from the processor and, typically, each peripheral device is separately connected to the processor unit by an individual set of cables, with each set of cables having a number of wires. The wires may be used for transferring information from the processor unit to the peripheral, as in the case of digital pixel data transferred to an active matrix flat panel display; or, the wires may used for transferring digital information from the peripherals to the processor unit, as in the case of digital data transferred from a keyboard or mouse to the processor unit.

FIG. 1 illustrates a conventional computer system 100 having a processor unit 101 and a number of peripherals coupled to the processor. The peripherals include a keyboard 102, a mouse 103, a display 104, a digital camera 105, and a pair of speakers 106a and 106b. As shown in FIG. 1, each of the peripherals is coupled to the processor unit through an individual cable assembly. Accordingly, the display 104 is coupled to the processor 101 through cable assembly 110, the keyboard 102 is coupled to the processor 101 through cable assembly 111, the mouse 103 is coupled to the processor 101 through cable assembly 112, the digital camera 105 is coupled to the processor 101 through cable assembly 114, and the pair of speakers 106a and 106b are coupled to the processor 101 through cable assemblies 115a and 115b. As can be seen from FIG. 1, this conventional computer system 100 requires a large number of wires to be coupled directly to the processor 101. This configuration is undesirable for a myriad of reasons which should be obvious to one of ordinary skill in the art.

In order to reduce the number of wires that the user must connect to a processor unit, information may be sent to and from a hub system where it is then routed to the proper peripheral. The hub system may be designed as a stand alone device or it may, preferably, be implemented within one of the peripherals, with each of the other peripherals being coupled thereto. FIG. 2 illustrates a computer system 200 having a hub system 201 coupled to a processor unit 202. In the prior art embodiment illustrated in FIG. 2, the hub system 201 is implemented within a display 203 and is fully integrated within the display 203. Additional peripherals, such as a keyboard 204, a mouse 205, a digital camera 206 and a pair of speakers 207a and 207b are each coupled to the hub system 201. The hub system 201 acts as a pass through port or routing system. As shown in FIG. 2, the processor unit 202 and the hub system 201 are coupled together by two different cable assemblies 210a and 210b. One of the cable assemblies 210a is used for transferring digital pixel data to display 203, and the other cable assembly is used for serially communicating digital data back and forth between the processor unit 202 and the hub system 201. Digital pixel data intended to be displayed is received over the first cable assembly 210a, retained, and properly processed for display by the display 203. However, the serial digital data intended for any of the other peripherals is received over the second cable assembly 210b, passed through the hub system 201, and routed to the proper peripheral. Accordingly, each of the other peripherals sends information to the processor unit 202 or receives information from the processor unit 202 through the hub system 201 over cable assembly 210b; while the display 203 receives digital pixel data over cable assembly 210a.

In one prior art embodiment, the cable assembly 210a will include four twisted wire differential pairs. This configuration is common in a computer system which uses TMDS communications for the transfer of digital pixel data from the processor unit 202 to the display 203. In a TIMDS system, a single twisted wire differential pair is used for each of the primary red, green and blue pixel data streams and a fourth twisted wire differential pair for transmitting a clock signal. Alternatively, the cable assembly 210a may include more than four twisted wire differential pairs depending upon the type of communications protocol used for transferring the digital pixel data. For example, a system which uses an LVDS communications protocol would require five twisted wire pairs for transferring the digital pixel data to the display 203.

FIG. 3 illustrates a prior art system for communicating digital pixel data over a first cable assembly 210a in a first direction from processing unit 202 to display 203; and, for communicating digital data over a second cable assembly 210b in a second direction from any of the peripherals coupled to the hub system of display 203 to processing unit 202. As shown, a transmitter 301 is implemented within the processor 202 for transmitting digital pixel data from the processor 202 to the display 203. A receiver 302 is implemented within the display 203 having a hub system for receiving digital pixel data for display from the processor 202. As indicated earlier, in a system which utilizes a TMDS communications protocol for transferring digital pixel data to display 203, cable assembly 210a is actually comprised of four twisted wire pairs, with a first twisted wire pair 305a used for transmitting red pixel data from the processor 202 to display 203, a second twisted wire pair 305b used for transmitting green pixel data from the processor 202 to display 203, and a third twisted pair 305c used for transferring blue pixel data from the processor 202 to display 203. The fourth twisted wire pair 305d is used for routing a clock signal from the processor 202 to the display 203 for synchronizing the digital pixel data at the receiver 302. Alternatively, the system may use any other appropriate communications protocol for transferring digital pixel data to the display 203, in which case the number of twisted wire differential pairs (or single wires) coupled between the processing unit 202 and the display 203 may vary.

Referring again to FIG. 2, cable assembly 210b will also include multiple wires for transmitting digital data to the processor 202 from each of the peripherals coupled to the hub system of display 203. These wires may use any one of various communications such as Universal Serial bus. The number of wires used in cable assembly 210b is dependent upon the particular system configuration. For example, it is desirable to be able to transmit digital data from the digital camera to the processor, while also transmitting data from the mouse or keyboard and accordingly multiple wires are required. Accordingly, as shown in FIG. 3, the processor unit 202 further includes a receiver 310, while the display 203 with hub system includes a transmitter 315. The transmitter 315 of the display 203 with hub system routes digital information incoming from the other peripherals coupled to the display 203 to the receiver in the processor 202. The prior art embodiment in FIG. 3 shows three twisted wire differential pairs 306a–c which may be used for communicating digital data from the peripherals coupled to the hub system of display 203 to the processing unit 202. It is understood, that in the prior art, any number of twisted wire pairs may be used for transferring such data. In the prior art embodiment illustrated in FIG. 3, the transmitter 315 generates its own clock reference signal on line 306c.

While the computer system illustrated in FIG. 2 may reduce the overall number of cable assemblies coupled directly to the processor 202, it is still undesirable because it requires a large number of wires. Accordingly, what is needed is a simpler system for liking the processor unit with the hub system without requiring multiple cabling assemblies which also reduces the number of wires coupled to the processor, thereby reducing costs and improving the performance of the system.

SUMMARY OF THE INVENTION

Data is transferred from a computer system to video display hardware in one direction. However, there are many reasons for data to be transferred in both directions along a cable connecting a computer and a monitor. This invention describes a method of sending data from a monitor back to the computer in a situation in which the video data transferred to the monitor is in digital form. Digital pixel data is transferred in a first forward direction from a computer to a monitor over differential wire pairs. Each of these differential wire pairs has an associated DC offset level. The present invention adjusts these DC offset levels such that two differential wire pairs may be used for transferring data in a second reverse direction. Slight alterations in the common DC offset level can be used to communicate information in a reverse direction. When the DC offset in the first differential wires pair is greater than the DC offset in the second differential pair, this indicates the transmission of a logic high or "one" in the reverse direction, and when the DC offset of the second differential wire pair is greater than the DC offset of the first differential wire pair, this indicates the transmission of a logic low or "zero" in the reverse direction. In this way, the DC offsets of the two differential wire pairs form an additional differential pair for data transmission in the reverse direction.

DETAILED DESCRIPTION OF PREFERRED EMBODIMENTS

The invention allows for bidirectional data transfer over a single set of signal lines coupled between a processor and a display terminal with hub system which is coupled to a plurality of additional peripherals. Preferably, the signal lines are twisted wire differential pairs used to transmit red, green and blue digital pixel data in a first direction from the processor to the display terminal whenever a data enable signal is active. Preferably, the data are transferred using a high common mode rejection ratio in each of the twisted wire differential pairs. Using this common mode, digital data may be serially transmitted in a reverse direction from the display terminal with hub system. The common mode is offset between two of the twisted wire differential pairs by varying the DC offset or reference voltage in one of the two twisted wire differential pairs relative to the other differential pair in the two twisted wire differential pairs. In this way, bidirectional data transfer is accomplished without increasing the number of twisted wire pairs coupled between the processor and display terminal with hub system.

Figure 1:
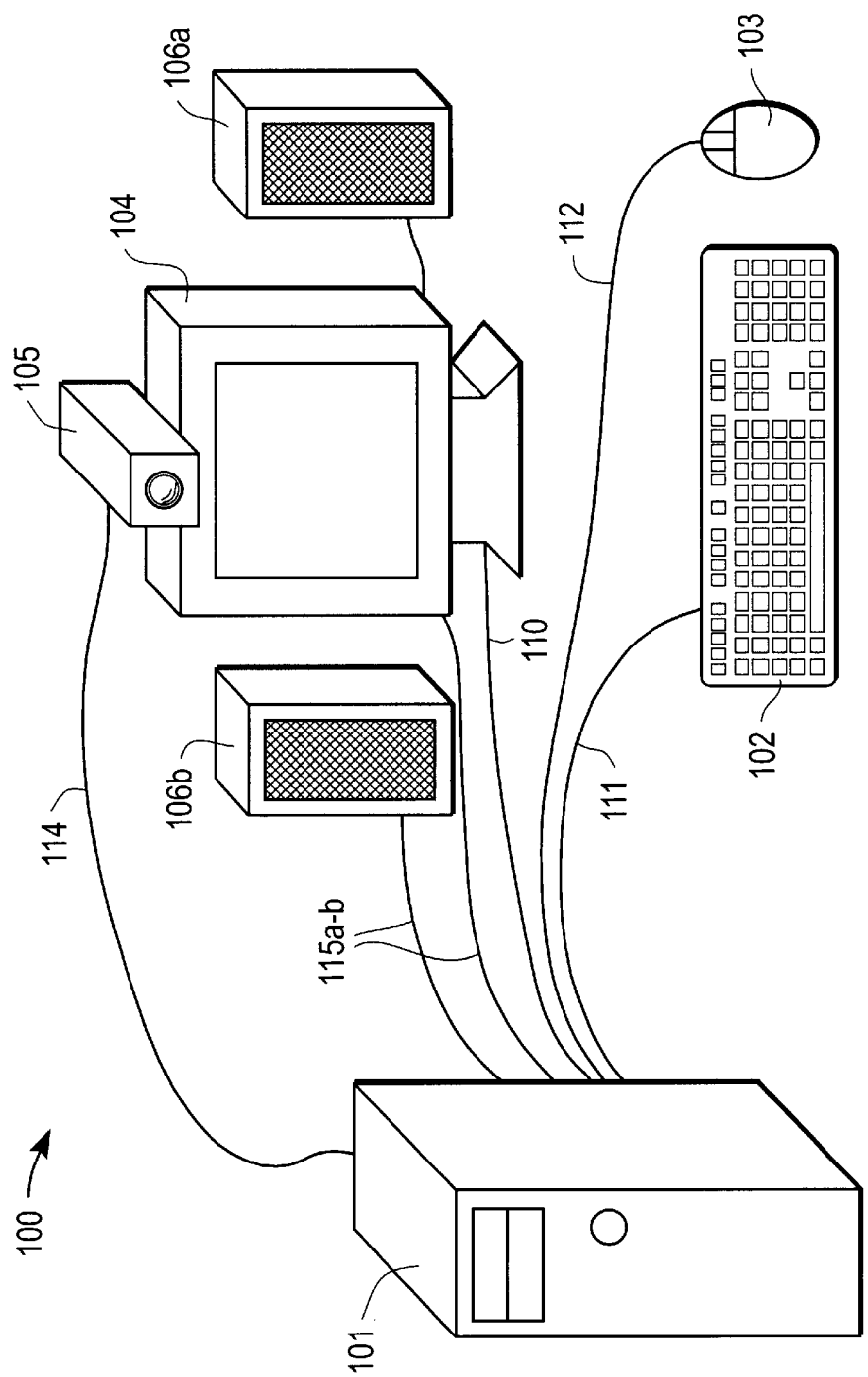
FIG. 1 illustrates a conventional computer system having a processor unit and a number of peripherals coupled to the processor.
Figure 2:
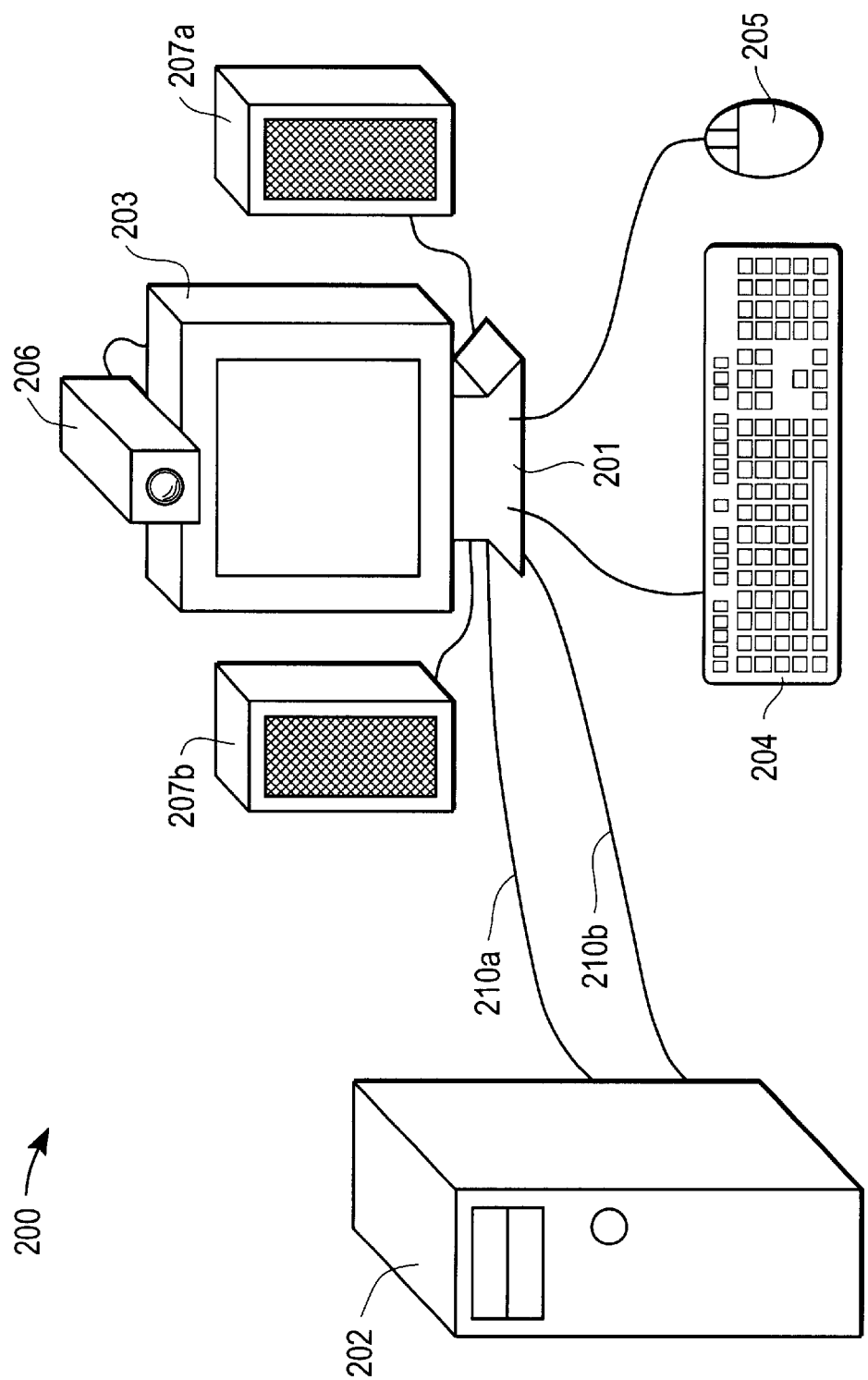
FIG. 2 illustrates a conventional embodiment of a computer system having a display with hub system coupled to a processor unit which utilizes two unidirectional cable assemblies for communications between the processor unit and the display with hub system.
Figure 3:
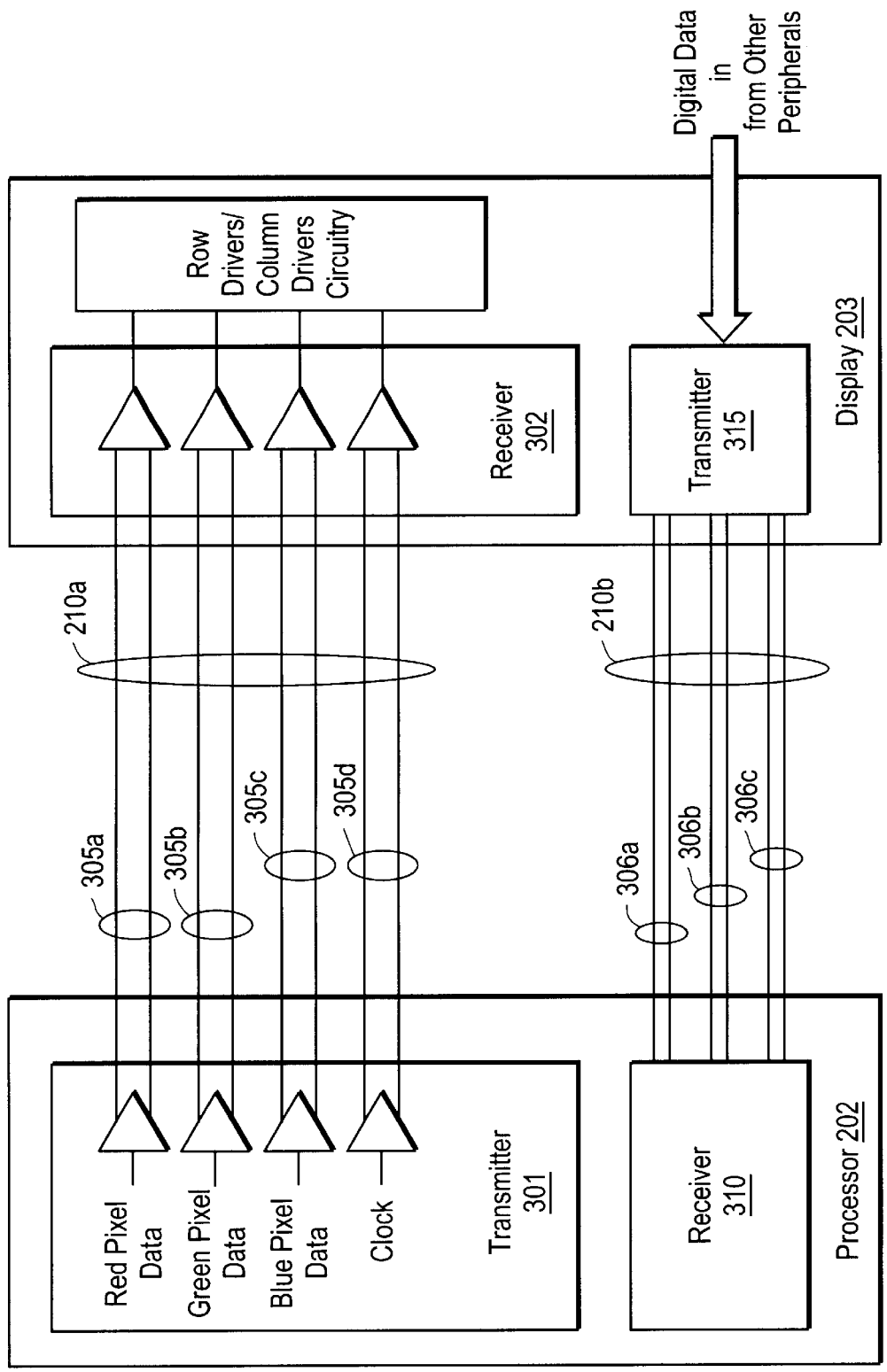
FIG. 3 illustrates prior art communication of digital pixel data in a forward direction over a first cable assembly and communication of digital data in a reverse direction over a second cable assembly between a processing unit and a display with hub system.
Figure 4:
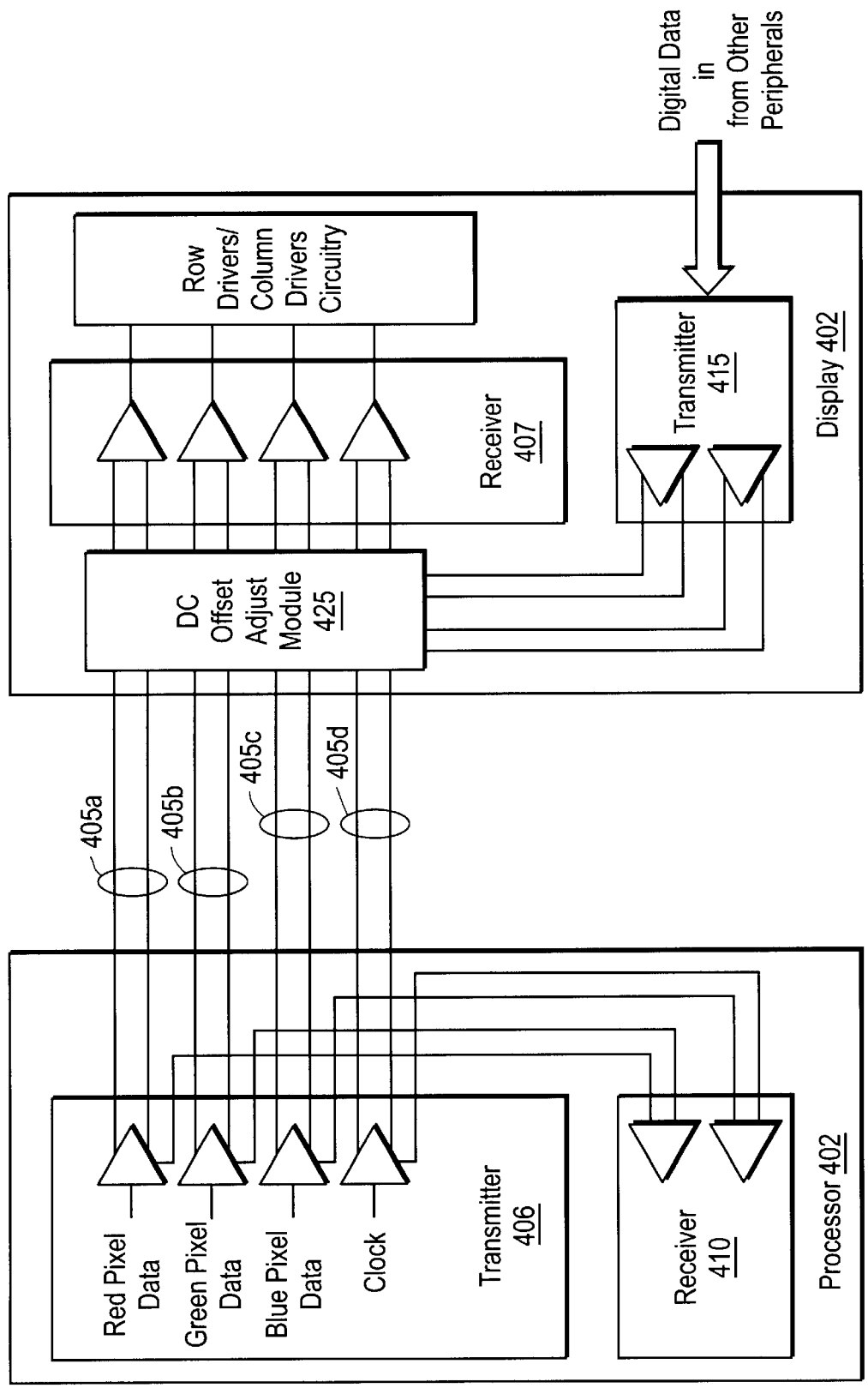
FIG. 4 illustrates a preferred embodiment of a computer system having a processor and display terminal coupled together with bidirectional data transfer in accordance with the present invention.

FIG. 4 illustrates a computer system which incorporates a preferred embodiment of the bidirectional data transfer system of the present invention. In the computer system illustrated in FIG. 4, a processor 401 includes a transmitter 406 and a receiver 410. In the embodiment illustrated in FIG. 4, the processor transmits digital pixel to a video display terminal 402 using a TMDS communications protocol. Accordingly, the processor is coupled to the video display terminal 402 through four twisted wire differential pairs 405a–d. The four twisted wire differential pairs 405a–d are preferably implemented within a single cable assembly. Alternatively, the processor 401 may transfer digital pixel data to the video display terminal 402 using any other appropriate communications protocol (such as LVDS), in which case the number of twisted wire differential pairs which are coupled between the processor 401 and the video display terminal 402 may be different. These twisted wire differential pairs are used to transmit red, green and blue digital pixel data to the video display terminal 402, along with a clock signal for synchronizing the data.

Preferably, the video display terminal 402 is an active matrix flat panel display having a built in hub system which allows other peripherals to be coupled to the video display terminal. However, it is understood that any other video display terminal may be used in alternate embodiments, so long as the communications between the processor 401 and the display terminal 402 are in a digital format and the display terminal includes a hub system for receiving digital data from other peripherals and passing the data through to the processor 401.

The display terminal 402 includes a receiver 407, a transmitter 415 and a DC offset module 425. The receiver 407 receives incoming digital pixel data and routes the data to row and column driver circuitry within the display terminal 402. Implementation of row and column driver circuitry is well known in the art and is not an aspect of this invention. Accordingly, the display terminal 402 may embody any type of row and column driver circuitry known in the art for producing a displayed image on the display terminal 402. The transmitter 415 in the display terminal 402 receives incoming digital data from a number of peripherals which may be coupled to the display terminal 402 and transmits this digital data to the processor unit 401 using the DC offset module 425. The DC offset module 425 is used to manipulate the DC offsets on two of the four twisted wire differential pairs 405a–d. Such that when the DC offsets in each of the two twisted wire pairs are compared, the difference between the two DC offsets is used to transmit digital data in a reverse direction.

Accordingly, both wires in a first pair may have their DC offset adjusted by a all amount while the DC offset in both wires of a second pair remains unchanged. The first DC offset is compared with the second offset in order to communicate digital formation in the reverse direction. Further, both wires in the second pair may have their DC offset adjusted by a small amount while the DC offset in both wires of the first pair remains unchanged. As explained, the first DC offset is compared with the second offset in order to communicate digital information in the reverse direction. The invention will alternate between adjusting the DC offset in the first pair or the DC offset in the second pair in order to transmit a logic high or "one" and a logic low or "zero" in the reverse direction. The DC offsets in both lines of a twisted wire pair are adjusted by a very small amount so that the digital pixel data transmitted in the forward direction, and received at the receiver 407 in the video display terminal 402, is not affected. However, relative differences between the DC offsets between the two different twisted wire pairs can be detected at the receiver 402 in the processor 402. This allows for the bidirectional transfer of digital data Accordingly, digital pixel data is transferred in a first direction from the processor 401 to the display 402 via at least four different twisted wire differential pairs. Digital data is also transferred in a reverse direction over two of the twisted wire differential pairs. Therefore, two or more additional channels for transferring data in the reverse direction are possible in a preferred embodiment.

Figure 5:
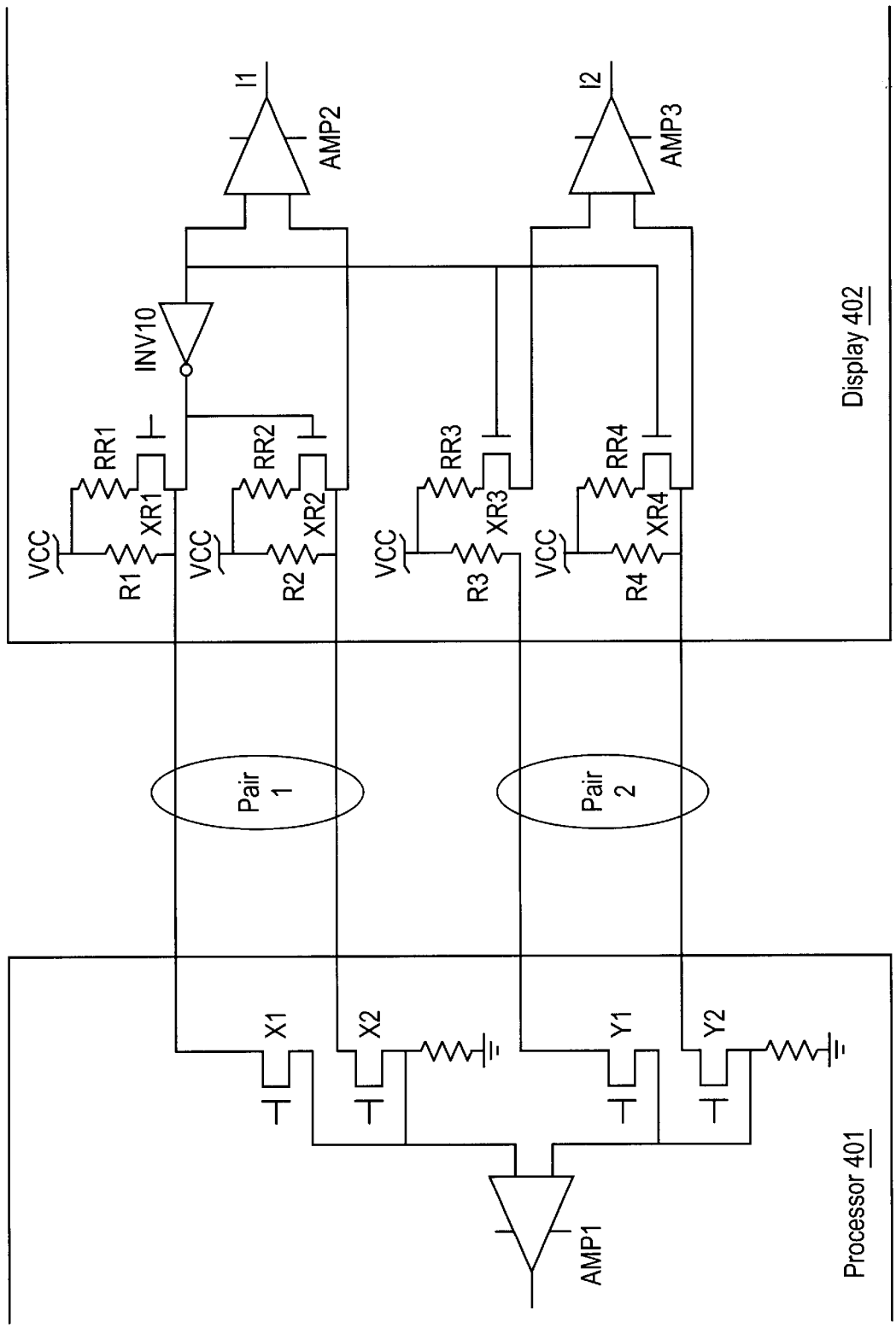
FIG. 5 illustrates a preferred embodiment of the present invention for bi-directional data transfer over a pair of twisted wire differential pairs using the DC offset to communicate information over the two twisted wire differential pairs.

FIG. 5 further illustrates the bidirectional transmission of digital data over two of the twisted wire differential pairs in a preferred embodiment of the present invention. As shown in FIG. 5, two of the twisted wire differential pairs are used as a single wire pair in order to transfer digital data in a reverse direction. As digital pixel data is transmitted over the twisted wire differential pairs, the DC ground and/or supply reference voltages for each of these twisted wire differential pairs is modulated by the transmitter in the display 402 in accordance with the digital data to be transferred from the peripherals to the processor 401 in a reverse direction. By modulating the DC offset or reference voltage between two of the differential pairs, digital information can be communicated in a reverse direction without effecting the forward transfer of data.

Preferably, two twisted wire differential pairs are used as a single differential pair to communicate digital information in a reverse direction. Each differential pair has its DC offset adjusted alternately in order to communicate the transmission of a logic high or logic low in the reverse direction. Using the system and method of the present invention, changes in the DC offset or supply voltage level between the two pairs are extracted or measured at the receiver in the processor unit In a preferred embodiment, the difference in the DC offset voltage level of the first twisted wire pair relative to the DC offset voltage level in the second twisted wire differential pair indicates the transmission of a logic high or "one" in the reverse direction, while a difference of opposite polarity between the DC offset voltage level of the second twisted wire differential pair relative to the DC offset voltage level in the first twisted wire differential pair indicates the transmission of a logic low or "zero".

FIG. 5 illustrates the communication of data in a reverse direction using a preferred embodiment of the present invention. For convenience, FIG. 5 shows a preferred embodiment using two twisted wire differential pairs. It is understood that the number of differential pairs actually used in the embodiment is not important so long as the number is grouped such that two differential twisted wire differential pairs are used for communicating digital data in a reverse direction in accordance with the present invention and the DC offsets in both wires of a single pair are equally adjusted so that data transferred over the pair in a forward direction is not affected. As shown in FIG. 5, a first twisted wire differential pair is coupled between the processor 401 and the video display terminal 402 via a set of transistors X1 and X2, implemented in the processor 401 and a pair of resistors R1 and R2, implemented in the video display terminal. Each of the transistors X1 and X2 in the processor 401 has a source coupled to the bidirectional signaling line, and a drain coupled to a non-inverting input of a first differential amplifier AMP1. Each of the resistors R1 and R2 in the video display terminal 402 has a first end coupled to a voltage source Vcc and a second end coupled to either of two inputs to a second differential amplifier AMP2, wherein the second end of resistor R1 is coupled to a non-inverting input of the second differential amplifier AMP2 and the second end of resistor R2 is coupled to the inverting input of the second differential amplifier AMP2.

As shown in FIG. 5, a second twisted wire differential pair is coupled between the processor 401 and the video display terminal 402 via a set of transistors Y1 and Y2, implemented in the processor 401 and a pair of resistors R3 and R4, implemented in the video display terminal. Each of the transistors Y1 and Y2 in the processor 401 has a source coupled to the bi-directional signaling line, and a drain coupled to an inverting input of the first differential amplifier AMP1. Each of the resistors R3 and R4 in the video display terminal 402 has a first end coupled to the voltage source Vcc and a second end coupled to either of two inputs to a third differential amplifier AMP3, wherein the second end of resistor R3 is coupled to the non-inverting input of the third differential amplifier AMP3 and the second end of resistor R4 is coupled to the inverting input of the third differential amplifier AMP2.

Both of the differential amplifiers AMP2 and AMP3 on the display 402 side have outputs 11 and 12, where 11 represents digital pixel data transmitted over the first twisted wire differential pair and 12 represents digital pixel data transmitted over the second twisted wire differential pair. In a forward operation, voltages are applied to the gates of transistors X1, X2 to cause a differential at the inputs of the second differential amplifier AMP2, in order to transmit digital pixel data over the first twisted wire pair in a forward direction. Likewise, voltages are applied to the gates of transistors Y1, Y2 to cause a differential at the inputs of the third differential amplifier AMP3, in order to transmit digital pixel data over the second twisted wire pair in a forward direction.

FIG. 5 further illustrates that on the video display terminal 402 side, two additional resistors RR1, RR2 and two additional transistors XR1, XR2 are serially coupled and implemented in parallel with resistors R1 and R2, respectively, in the first twisted wire differential pair. Accordingly, resistor RR1 has a first end coupled to the voltage source Vcc and a second end coupled to the source of transistor XR1. The drain 45 of transistor XR1 is coupled to the second end of resistor R1, such that resistor RR1 and transistor XR1 are arranged in parallel with resistor R1. Likewise, resistor RR2 has a first end coupled to the voltage source Vcc and a second end coupled to the source of transistor XR2. The drain of transistor XR2 is coupled to the second end of resistor R2, such that resistor RR2 and transistor XR2 are arranged in parallel with resistor R2. The gates of transistors XR1 and XR2 are coupled to the output of an inverter INV10.

FIG. 5 further illustrates that on the video display terminal 402 side, two additional resistors RR3, RR4 and two additional transistors XR3, XR4 are serially coupled and implemented in parallel with resistors R3 and R4, respectively, in the second twisted wire differential pair. Accordingly, resistor RR3 has a first end coupled to the voltage source Vcc and a second end coupled to the source of transistor XR3. The drain of transistor XR3 is coupled to the second end of resistor R3, such that resistor RR3 and transistor XR3 are arranged in parallel with resistor R3. Likewise, resistor RR4 has a first end coupled to the voltage source Vcc and a second end coupled to the source of transistor XR4. The drain of transistor XR4 is coupled to the second end of resistor R4, such that resistor RR4 and transistor XR4 are arranged in parallel with resistor R4. The gates of transistors XR1 and XR2 are coupled to the input of the inverter INV10.

In operation, digital data can be transmitted in the opposite or reverse direction when a signal is applied at the input of the inverter INV10. If the signal applied at the input of the inverter INV10 is a logic high, then the output from the inverter INV10 is low and the transistors XR1 and XR2 remain off. Accordingly, no current flows through the resistors RR1 and RR2 and the DC offset of the first differential pair remains unchanged. However, when the signal applied at the input of the inverter INV10 is high, the transistors XR3 and XR4 are turned on, causing current to flow through the resistors RR3 and RR4. The resistor values for RR3 and RR4 are chosen such as to provide a slight voltage change in the DC offset of the second twisted wire differential pair. Accordingly, the inverting input (the DC offset of the second differential pair) to the first differential amplifier AMP1 is lower than the non-inverting input (the DC offset of the first differential pair), and the output from the first differential amplifier AMP1 preferably reflects this as the transmission of a logic high or one in a reverse direction.

Oppositely, if the signal applied at the input of the inverter INV10 is low, then the output from the inverter INV10 is high and the transistors XR1 and XR2 are turned on. When this occurs, current flows through the resistors RR1 and RR2 and the DC offset of the first differential pair changes. However, when the signal applied at the input of the inverter INV10 is low, the transistors XR3 and XR4 remain off, causing no current to flow through the resistors RR3 and RR4. Therefore, the DC offset in the second differential pair remains the same. Once again, the resistor values for RR1 and RR2 are chosen such as to provide a slight voltage change in the DC offset of the first twisted wire differential pair. Accordingly, the non-inverting input (the DC offset of the first differential pair) to the first differential amplifier AMP1 is lower than the inverting input (the DC offset of the first differential pair), and the output from the first differential amplifier AMP1 preferably reflects this as the transmission of a logic low or zero in a reverse direction.

Accordingly, digital pixel data can be transferred in a forward direction using individual differential wire pairs, while digital data can be transferred in a reverse direction by using two of these individual differential wire pairs and slightly adjusting the DC offsets between the two pairs such that a difference in the DC offset of a first pair relative to a second pair transmits a logic high or "one" in the reverse direction; while a difference of opposite polarity between the DC offset of the second pair relative to the first pair transmits a logic high or "one" in the reverse direction. Since both wires in a single wire pair have their DC offset adjusted, digital pixel data transmitted over each individual twisted wire pair in a forward direction is unaffected.

What is claimed is:

1. A method for communicating bi-directionally between a processor and a video display monitor comprising the steps of:

transmitting digital pixel data from the processor to the video display monitor in a forward direction over two differential wire pairs; and transmitting digital data from the video display monitor to the processor in a reverse direction over the two differential wire pairs by manipulating the DC offsets in the two differential wire pairs thereby using the two differential wire pairs as a single differential pair.

2. The method of claim 1, wherein the digital pixel data is transmitted in the forward direction over the two differential wire pairs while at the same time the digital data is transmitted in the reverse direction over the two differential wire pairs.

3. The method of claim 1, wherein the DC offset of a first differential wire pair in the two differential wire pairs is manipulated such that the DC offset in the first differential wire pair is higher than the DC offset in a second differential wire pair in the two differential wire pairs, thereby indicating the transmission of a logic one in the reverse direction.

4. The method of claim 1, wherein the DC offset of a first differential wire pair in the two differential wire pairs is manipulated such that the DC offset in the first differential wire pair is lower than the DC offset in a second differential wire pair in the two differential wire pairs, thereby indicating the transmission of a logic zero in the reverse direction.

5. A system for communicating bi-directionally between a processor, a video display monitor, and at least one additional peripheral coupled to the video display monitor, the system comprising:

a transmitting unit within the processor for transmitting digital pixel data from the processor to the video display monitor in a forward direction over a plurality of differential pairs wherein each differential pair has an associate DC offset, a DC offset adjust module within the video display monitor for manipulating the DC offsets between two differential pairs in the plurality in order to transmit digital data from the at least one peripheral to the processor over the two differential pairs in the plurality.

6. The system of claim 5, further comprising:

a receiving unit within the processor for detecting any manipulation between the DC offsets of the two differential pairs in the plurality and thereby receiving digital data from the at least one peripheral.

7. The system of claim 5, wherein the DC offset module manipulates the DC offsets to show an increase in the DC offsets between the two differential pairs, thereby indicating the transmission of a logic one in the reverse direction.

8. The system of claim 5, wherein the DC offset module manipulates the DC offsets to show a decrease in the DC offsets between the two differential pairs, thereby indicating the transmission of a logic zero in the reverse direction.

9. An apparatus for communicating bi-directionally comprising:

a processor including a transmitter for transmitting digital pixel data in a forward direction over a plurality of differential pairs wherein each differential pair has an associate DC offset, a display for receiving the digital pixel data, wherein the display includes a DC offset adjust module for manipulating the DC offsets between two differential pairs in the plurality in order to transmit digital data in a reverse direction from the display to the processor over the two differential pairs in the plurality.

10. The apparatus of claim 9 wherein the processor further includes a receiving unit within the processor for detecting the manipulation between the DC offsets of the two differential pairs in the plurality and thereby receiving digital data transmitted in the reverse direction over the two differential pairs in the plurality.

11. The apparatus of claim 9, wherein the relative difference between the first of the two differential pairs and the second of the two differential pairs indicates the transmission of a logic high in the reverse direction.

12. The apparatus of claim 9, wherein the relative difference between the second of the two differential pairs and the first of the two differential pairs indicates the transmission of a logic low in the reverse direction.

* * * * *